United States Patent
Nomizu et al.

(10) Patent No.: US 7,450,773 B2
(45) Date of Patent: Nov. 11, 2008

(54) IMAGE PROCESSING APPARATUS AND IMAGE PROCESSING METHOD, IMAGE PROCESSING SYSTEM, IMAGE PROCESSING PROGRAM AND STORAGE MEDIUM

(75) Inventors: Yasuyuki Nomizu, Kanagawa (JP); Hiroyuki Sakuyama, Tokyo (JP); Junichi Hara, Kanagawa (JP); Nekka Matsuura, Kanagawa (JP); Takanori Yano, Kanagawa (JP); Taku Kodama, Kanagawa (JP); Toshio Miyazawa, Kanagawa (JP); Yasuyuki Shinkai, Kanagawa (JP); Takayuki Nishimura, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 1002 days.

(21) Appl. No.: 10/758,638

(22) Filed: Jan. 14, 2004

(65) Prior Publication Data
US 2004/0217887 A1 Nov. 4, 2004

(30) Foreign Application Priority Data
Jan. 14, 2003 (JP) ............... 2003-005534
Dec. 26, 2003 (JP) ............... 2003-433613

(51) Int. Cl.
G06K 9/36 (2006.01)
G06K 9/46 (2006.01)

(52) U.S. Cl. .............. 382/244; 382/232; 382/233; 382/245; 382/250; 382/251; 345/698; 345/699; 348/561; 358/451

(58) Field of Classification Search ......... 382/232–233, 382/244–245, 250–251, 293, 276, 298–299, 382/309; 345/698–699, 660–671; 348/561, 348/581–582; 358/451
See application file for complete search history.

(56) References Cited

U.S. PATENT DOCUMENTS 5,790,708 A * 8/1998 Delean ............... 382/270

(Continued)

FOREIGN PATENT DOCUMENTS

EP 1 233 624 A1 8/2002

(Continued)

OTHER PUBLICATIONS

Boliek, Martin, "JPEG 2000 Part I Final Committee Draft Version 1.0," Mar. 16, 2000, ISO/IEC JTC1/SC29/WG1 N1646, pp. A, B, I-Xii, 1-190, XP001004858.

(Continued)

*Primary Examiner*—Matthew C Bella
*Assistant Examiner*—Ali Bayat
(74) *Attorney, Agent, or Firm*—Blakely, Sokoloff, Taylor & Zafman LLP

(57) ABSTRACT

An image processing apparatus includes an image data acquisition unit to acquire first encoded image data of a first data size, an image data creation unit to create a second encoded image data of a second, smaller data size than the first data size from the first encoded image data, a display unit to display an image corresponding to the second encoded image data in a displayunit, an editing unit to accept an edit operation to the image displayed in the display unit and for applying an edit processing corresponding to the edit operation to the first encoded image data, and an edit-result manifesting unit to manifest a result of the edit processing to the second encoded image data.

49 Claims, 14 Drawing Sheets

U.S. PATENT DOCUMENTS

| | | | |
|---|---|---|---|
| 6,020,982 A * | 2/2000 | Yamauchi et al. | 358/444 |
| 6,041,143 A | 3/2000 | Chui et al. | |
| 6,724,977 B1 * | 4/2004 | Linzer | 386/52 |
| 7,271,832 B1 * | 9/2007 | Parulski et al. | 348/231.99 |
| 2004/0174561 A1 * | 9/2004 | Fukunaga et al. | 358/1.15 |
| 2005/0210145 A1 * | 9/2005 | Kim et al. | 709/231 |

FOREIGN PATENT DOCUMENTS

| | | |
|---|---|---|
| JP | 04-087460 | 3/1992 |
| JP | 11-144052 | 5/1999 |

OTHER PUBLICATIONS

Boudier, Thomas, Shotton, David M., "VIDOS, A System for Video Editing and Format Conversion Over the Internet," Computer Networks, Elsevier Science Publishers B.V., Amsterdam, NL, vol. 34, No. 6, Dec. 2000, pp. 931-944, XP004304831, ISSN: 1389-1286.

European Search Report mailed Mar. 31, 2004, European Application No. 04250161.9, 5 pages.

* cited by examiner

FIG.3
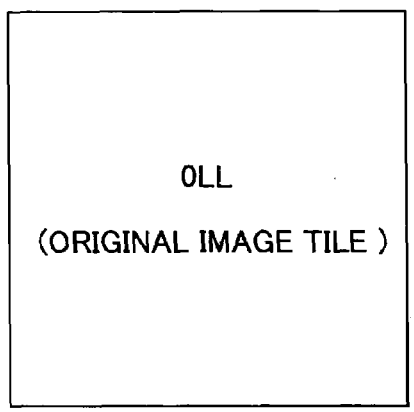
DECOMPOSITION LEVEL 0
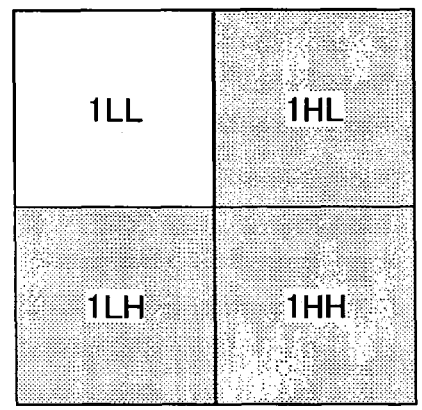
DECOMPOSITION LEVEL 1
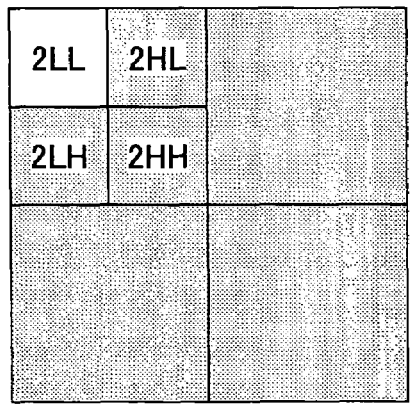
DECOMPOSITION LEVEL 2
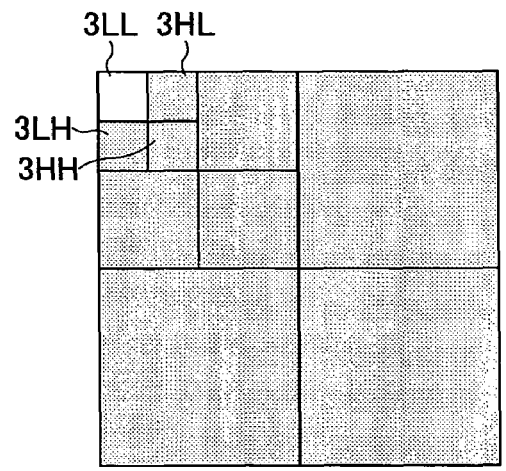
DECOMPOSITION LEVEL 3

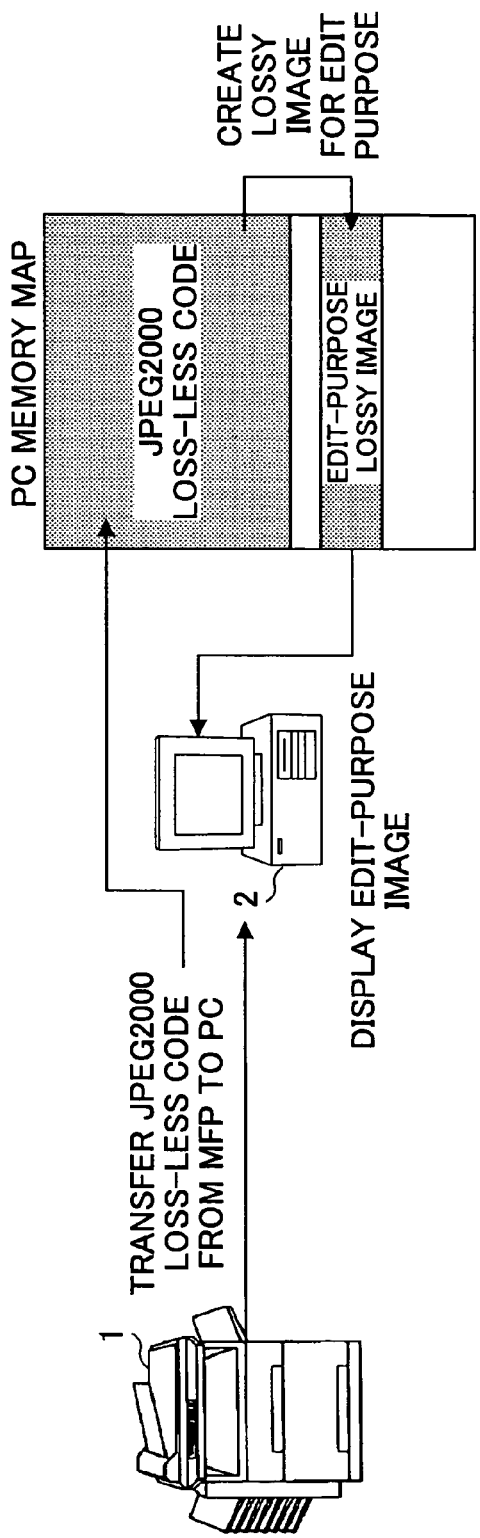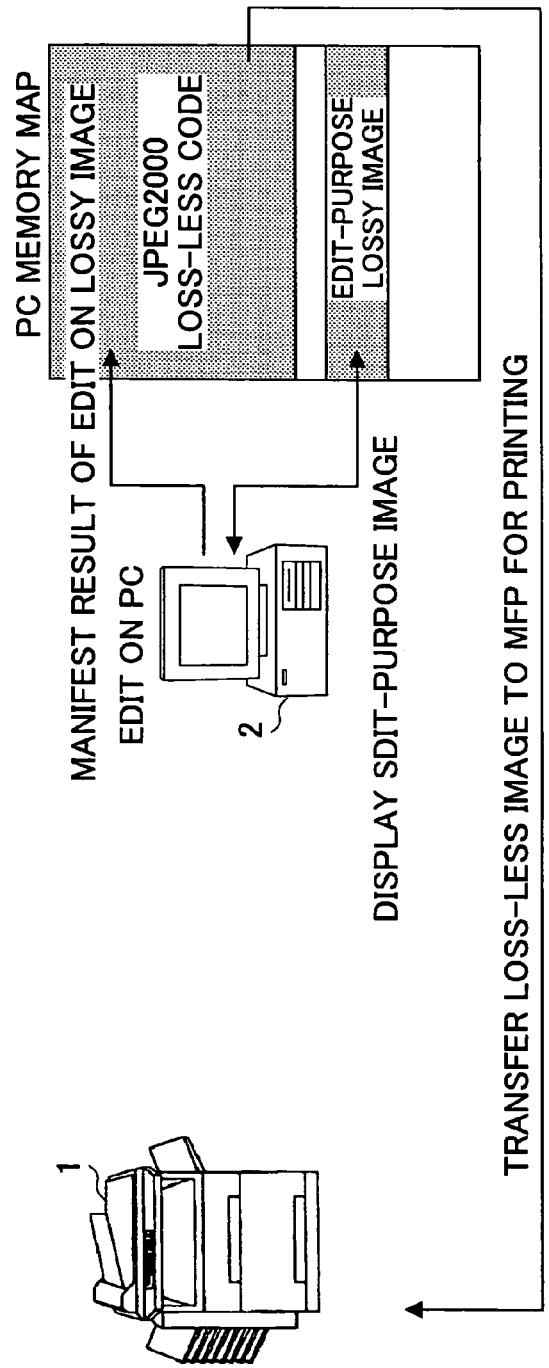
FIG.9A
FIG.9B

IMAGE PROCESSING APPARATUS AND IMAGE PROCESSING METHOD, IMAGE PROCESSING SYSTEM, IMAGE PROCESSING PROGRAM AND STORAGE MEDIUM

The present application claims priority to the corresponding Japanese Application Nos. 2003-005534, filed on Jan. 14, 2003 and 2003-433613, filed on Dec. 26, 2003, the entire contents of which are hereby incorporated by reference.

BACKGROUND OF THE INVENTION

The present invention relates to image processing apparatuses, image processing systems, image processing programs and storage media for image processing programs.

Digital image processing apparatuses of these days are required to process high-quality image data characterized by high resolution and large number of gradations. Because such high-quality image data includes a large amount of information therein, the image processing apparatus used for processing such high quality image data is subjected to severe processing load. For example, a black-and-white image of 256 gradations has the amount of information of eight times as large as that of a binary image (black-and-white image). Accordingly, the image processing apparatus used for processing such an image is required to have a memory capacity of at least eight times as large as the case of processing binary black-and-white image merely for the purpose of storing the image data, and thus, the cost of the apparatus increases inevitably.

Because of this, it has been practiced to reduce the necessary memory capacity by encoding the image to be processed.

For the encoding method capable of reducing the amount of data efficiently, the use of JPEG is recommended by ISO (INTERNATIONAL ORGANIZATION FOR STANDARDIZATION) and ITU-T (INTERNATIONAL TELECOMMUNICATION UNION-TELECOMMUNICATION STANDARDIZATION SECTOR) as the standard process for compressing high quality image data and for encoding multiple gradation images including color images.

JPEG includes a basic process that uses DCT (discrete cosine transformation) and an optional process that uses DPCM (differential pulse code modulation). The DCT process encodes the original image information to frequency information by using discrete cosine transform. This process utilizes visual characteristics of human beings and achieves the desired reduction of the amount of information of the original picture in such a manner that there is caused no degradation in the picture quality. This encoding process is a so-called irreversible encoding process.

On the other hand, the latter method that uses DPCM predicts the level of the picture element of attention from the surroundings picture elements and encodes the error of the prediction. According to this process, it is possible to encode the original picture without degrading the quantity of the information of the original picture. Thus, this is a reversible encoding method. Reference should be made to Japanese Patent 3,105,906.

In order to encode image data while maintaining high picture quality, the use of a DCT process having high efficiency is suited. However, from the viewpoint of preservation of the original information, the use of a reversible DPCM process is more preferable than the irreversible DCT method.

Ideally, it is desirable to use a reversible encoding process capable of conducting high efficiency compression simultaneously. However, the state of art reversible encoding process that uses the DPCM process cannot provide satisfactory efficiency of data compression. Because of this, the DCT process is used commonly in personal computers, and the like, for compressing multi-level images having a relatively large number of gradations.

However, in the case of the DCT process, there is a tendency that the picture quality is deteriorated extremely as a result of occurrence of block distortion pertinent to this process or the formation of mosquito noise in the outline part of the images when the compressibility is increased. This tendency appears conspicuous particularly in character images and raises a serious problem in the picture quality.

Further, while the JPEG process may be an optimum process for reducing the memory capacity necessary for holding images in an image processing apparatus, it is not an optimum process for the purpose of editing or processing of images used with digital copying machines or multi-functional machines (MFP), and the like. This is because the JPEG process cannot specify a position in the image in the encoded state. In other words, the JPEG process cannot decode a particular part of the image specified arbitrarily.

When conducting editing of image data in the JPEG process, it has been necessary to decode all the image data and conduct the desired editing process to the decoded image data. Thereby, there is a need for conducting the process of encoding the edited image again. During such a process, there arises a problem that a very large memory is used for holding the decoded image. For example, it should be noted that an RGB color image of A4 size, 600 dpi resolution, needs the memory size of about 10 Mbytes.

As a method capable of solving this problem of memory usage at the time of edit processing, it is conceivable to use an encoding process of fixed length. Reference should be made to Japanese Laid Open Patent Application 11-144052, for example.

It should be noted that the encoding technology of images is divided largely into the variable length process and the fixed length process according to the code word length after encoding.

Here, the former has the advantageous feature of good encoding efficiency and enabling reversible encoding, while in the case of the latter process, it is possible to know the location in the image after encoding in the encoded state. This means that it is possible to reproduce the image of an optional part arbitrarily. In other words, this means that edit processing, and the like, becomes possible in the encoded state.

On the other hand, the fixed length encoding process has drawbacks in that encoding efficiency is generally poor as compared with the variable length encoding process and that reversible encoding is difficult.

On the other hand, the encoding process called JPEG 2000 attracts attention these days as the process capable of solving the drawback of the abovementioned JPEG encoding process.

JPEG 2000 is a transformation encoding process that uses a wavelet transformation, and it is predicted that JPEG 2000 will replace JPEG in the field of still images including color images from now on.

JPEG 2000 has various novel and practical functions, in addition to the feature of reducing the problem of picture quality deterioration in the low bit rate, which is pertinent to JPEG. In such a novel function, there is a process called tile processing. It should be noted that this tile processing is a technology that divides an image into small regions. The encoding is conducted in these small regions independently. As a result of this function, it becomes possible to specify a particular desired region of an image in the encoded state and it becomes possible to conduct edit processing in the encoded state.

On the other hand, while JPEG 2000 encoding process has such various desirable features, there is a problem that the processing becomes inevitably complex in order to realize such various functions and simultaneously a high performance process.

In the case of JPEG2000, for example, a processing time of about 4-5 times is needed when processing by software as compared to the case of using the JPEG encoding process, and there arises a serious problem of operability of the user in the applications for editing.

In more detail, there are many cases, when editing images, in which it is desirable to apply direct processing to the images subjected to editing, while such a method requires a large workspace when handling a large-size image. In the case of conducting editing by utilizing a personal computer, for example, a large memory size becomes necessary for storing the image.

Especially, there are cases these days to connect an image formation apparatus such as a digital copying machine or a multifunctional machine (MFP) to a personal computer via a network for conducting an editing operation not capable of being performed through an operational panel of the image formation apparatus, such as erasing of traces of stapler or punch holes in a manuscript. In such editing, there frequently occurs a process of incorporating the image data of a scanned manuscript into a personal computer, applying a desired editing to the image data with the personal computer, and returning the image data thus applied with the desired edit processing to the image formation device and printing out the edited image. During such editing, it should be noted that there frequently occurs the situation in which the memory area or data storage device of the personal computer is occupied by the large image data.

In order to solve this problem and to save the memory area of the personal computer, it is conceivable to place only the encoded image in the memory area. However, in the case of editing images of high picture quality, it is necessary to use a reversible encoding process characterized by a large data quantity, and it is generally inevitable that the processing speed becomes slow associated when processing large-size data. Also, in the case the encoding process allows random access to the encoded data, it becomes necessary to conduct a decoding process on the entire encoded image data each time, and it is a possibility that the processing speed becomes slower than storing the images directly.

SUMMARY OF THE INVENTION

An image processing apparatus and image processing method, image processing system, image processing program and storage medium are described. In one embodiment, the image processing apparatus, comprises: an image data acquisition unit to acquire a first encoded image data of a first data size; an image data creation unit to create a second encoded image data of a second, smaller data size than the first data size from the first encoded image data; a display unit to display an image corresponding to the second encoded image data in a display unit; an editing unit to accept an edit operation to the image displayed in the display unit and for applying edit processing corresponding to the edit operation to the first encoded image data; and an edit-result manifesting unit to manifest a result of the edit processing to the second encoded image data.

BRIEF DESCRIPTION OF THE DRAWINGS

FIG. 3 is a diagram showing sub bands of respective decomposition levels for the case in which the decomposition level number is three;

FIGS. 9A and 9B are schematic diagrams showing an example of image edit processing;

DETAILED DESCRIPTION OF THE INVENTION

Figure 1:
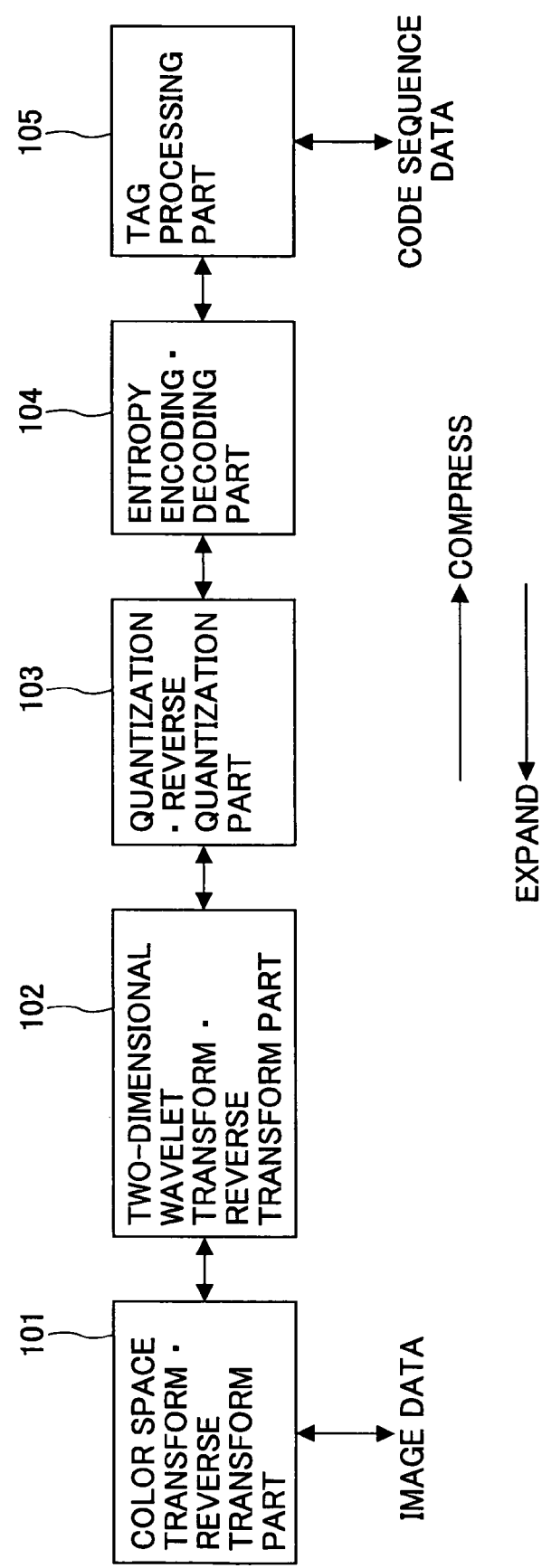
FIG. 1 is a functional block diagram of a system that performs a fundamental algorithm of JPEG2000 process, which is used in the embodiments of the present invention.

One embodiment of the present invention provides a novel and useful image processing technology wherein the foregoing problems are eliminated.

Other and more specific embodiments of the present invention include an image processing apparatus, an image processing system, an image processing program and a storage medium for the image processing program capable of editing images with high picture quality and simultaneously with high speed.

Another embodiment of the present invention comprises an image processing apparatus having: an image data acquisition unit to acquire first encoded image data of a first data size; an image data creation unit to create second encoded image data of a second, smaller data size than the first data size from the first encoded image data; a display unit to display the second encoded image data in a display unit; an editing unit to accept an edit operation to the second encoded image data displayed in the display unit and applying edit processing corresponding to the edit operation to the first encoded image data; and an edit-result manifesting unit to manifest an edit result obtained as a result of the edit processing to the second encoded image data.

According one embodiment of the present invention, the image data acquisition unit acquires the first encoded image data in the form of loss-less image data.

According to another embodiment of the present invention, the image data acquisition unit acquires the first encoded image data by way of a reversible mode of JPEG2000 algorithm.

According to another embodiment of the present invention, the image data creation unit creates the second encoded image data from the first encoded image data in the form of lossy image data.

According to another embodiment of the present invention, the image data creation unit acquires the second encoded image data by way of irreversible mode of JPEG2000 algorithm.

According to another embodiment of the present invention, the second encoded image data is the data in which the resolution or number of gradations of the first encoded image data is reduced.

According to another embodiment of the present invention, the image data creation unit creates the second encoded image data from the first encoded image data for a part of the first encoded image data reversibly in the form of loss-less image data.

According to another embodiment of the present invention, the image data acquisition unit acquires the first encoded image data in the form of loss-less image data by dividing an original image into one or more regions and by compressing the original image reversibly for each of the regions, and the image data creation unit forms the second encoded image data reversibly in the form of loss-less image data from the first encoded image data for a part of the plural regions.

According to one embodiment of the present invention, the image data creation unit decodes the second encoded image data by a reversible mode of JPEG2000 algorithm in the form of loss-less image data.

According to another embodiment of the present invention, the editing unit applies the edit processing to the first encoded image data one by one each time the edit operation is accepted.

According to another embodiment of the present invention, the editing unit applies the edit processing to the first encoded image data with a predetermined timing.

According to another embodiment of the present invention, the image processing apparatus further includes a storage device that saves the edit operation.

According to another embodiment of the present invention, the editing unit applies the edit processing corresponding to the edit operation to the first encoded image data with the timing designated by the user.

According to another embodiment of the present invention, the editing unit performs the edit processing corresponding to the edit operation to the first encoded image data with upon completion of the edit operation.

According to another embodiment of the present invention, the image processing apparatus includes an output unit to output the first encoded image data to an outside of the image processing apparatus after the edit processing conducted by the editing unit.

Another embodiment of the present invention comprises an image processing system in which an image processing apparatus is connected to an image formation apparatus through a network, and the image processing apparatus comprising: an image data acquisition unit to acquire first encoded image data of a first data size; an image data creation unit to form second encoded image data of a second, smaller data size than the first data size from the first encoded image data; a display unit to display an image corresponding to the second encoded image data in a display unit; an editing unit to accept an edit operation to the image displayed in the display unit and for applying an edit processing corresponding to the edit operation to the first encoded image data; an edit-result manifesting unit to manifest an edit result of the edit processing to the second encoded image data; and an output unit to output the first encoded image data to an outside of the image processing apparatus after the edit processing by the editing unit, where the first encoded image data is supplied to the outside after the edit processing by the image edit processing unit, by the output unit via the network.

Further, an embodiment of the present invention includes an image formation method that implements the function of the image formation apparatus or image processing system and also a computer-readable medium that stores the program code of the image formation method.

According to one embodiment of the present invention, it becomes possible for a user to apply a desired edit operation to the first encoded image data while viewing the second encoded image data with quick response, without causing slowdown of processing speed or without the need of reinforcing specific hardware such as memory, storage device, CPU, and the like, by creating a second, compact encoded image data from the first encoded image data and by manifesting the edit operation added to the first encoded image data also to the second encoded image data, and it becomes possible to conduct the desired editing work easily and in a short time, without degrading the picture quality of the original image. In such a case, it should be noted that heavy loading of the image display system of the computer is successfully avoided by implementing the edit operation of the original image in the background.

For example, the first encoded image data may be loss-less image data encoded by a reversible process and the second encoded image data used by the user at the time of the edit operation may be compact lossy image data transformed from the loss-less image data encoded by an irreversibly process. With this, the lossy encoded image data suitable for display is used by the user for the editing work in view of processing speed and storage capacity. In such a case, high speed access to the image becomes possible, and it becomes possible to realize an image processing system allowing editing with high speed while maintaining high picture quality for the first encoded image data subjected to the editing. For the second encoded image data, it is possible to use image data in which the resolution or number of gradations is reduced. For the acquisition of the first encoded image data or formation of the second encoded image data, it is possible to use JPEG2000 algorithm, which can perform both reversible and irreversible compression and transformation from reversible compression to irreversible compression is possible in the encoded state.

Further, by dividing the first image into plural regions and forming the second encoded image data for the divided regions as loss-less encoded image data, a similar efficient editing work becomes possible.

It should be noted that such division of an image into regions and encoding process conducted for each region thus divided are standard procedure in JPEG2000 algorithm. Particularly, at the time of the decoding process, it is possible to form the second image of compact size with a loss-less process, by utilizing the characteristics of JPEG2000 algorithm, which allows random accessing. In this case, because the second encoded image data is loss-less data, it is possible to reproduce the first encoded image data applied with the editing work without causing deterioration of picture quality for the specified region from the second encoded image data.

Such edit processing of the first encoded image data may be conducted each time the edit operation is carried out, or alternatively in a single step with the timing specified by the user or with the timing when a series of edit operation has been completed, by saving the individual edit operations.

Further, it is possible to connect the image processing apparatus having such an image editing function with an image formation device via a network and apply desired editing to the image data acquired by the image formation device via the network.

Hereinafter, an embodiment of the present invention will be explained with reference to the drawings.

Outline of JPEG2000

One embodiment of the present invention utilizes JPEG2000 algorithm capable of conducting both reversible and irreversible process and further capable of conducting transformation from reversible to irreversible in the encoded state. Thus, outline of JPEG2000 will be explained at first.

FIG. 1 is a functional block diagram for illustrating the fundamentals of JPEG2000 algorithm.

Referring to FIG. 1, JPEG2000 algorithm is constructed by the functional blocks of: a color space transformation/reverse transformation unit 101; a two-dimensional wavelet transformation/reverse transformation unit 102; a quantization/reverse quantization unit 103; an entropy encoding/decoding unit 104; and a tag processing unit 105.

Hereinafter, each point of FIG. 1 will be explained.

First, an explanation will be made for the color space transformation/reverse transformation unit 101 and the two-dimensional wavelet transformation/reverse transformation unit 102 with reference to FIGS. 2 and 3.

Figure 2:
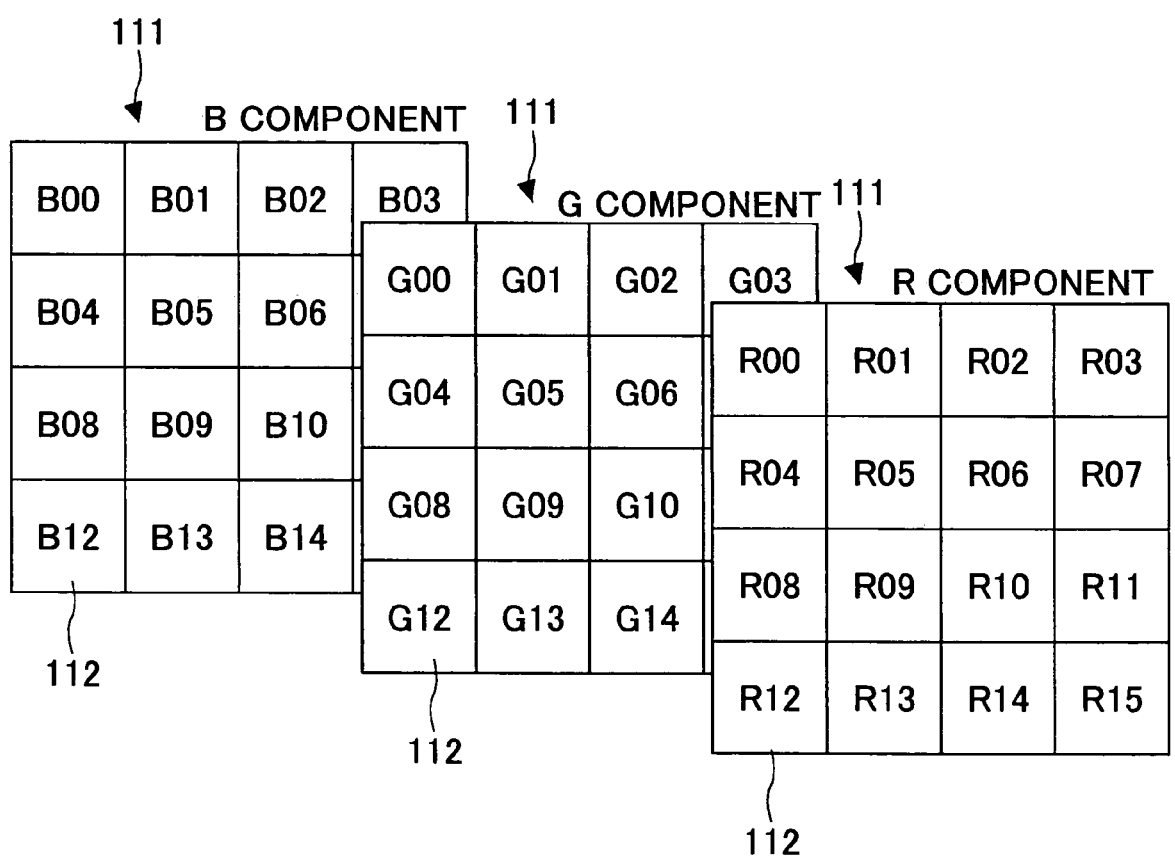
FIG. 2 is a diagram showing rectangular regions divided out from an original image for each component.

FIG. 2 shows an example of color components divided out from an original color image.

Referring to FIG. 2, each of color components R, G, B (111) are separated from an original color image by an RGB primary color system, for example, wherein each of the components R, G and B are divided into a plurality of rectangular regions (tile) 112. Each tile 112, such as the tiles R00, R01, . . . , R15/G00, G01, . . . , G15/B00, B01 . . . B15, constitutes a fundamental unit of implementing a compression/decompression process of JPEG2000 algorithm, and thus, the foregoing compression/decompression process is conducted independently in each tile 112 and independently for each of the color components R, G and B (111).

Referring to FIG. 1, the data of each tile 112 is input to the color space transformation/reverse transformation unit 101 shown in FIG. 1 at the time of encoding the image data by JPEG2000, and after the color space transformation, a two-dimensional wavelet transformation (forward transformation) is applied in the two-dimensional wavelet transformation/reverse transformation unit 102. Thereby, frequency division is conducted for each tile.

FIG. 3 shows the sub bands in each decomposition level for the case in which the decomposition level number is 3.

Referring to FIG. 3, the two-dimensional wavelet transformation/reverse transformation unit 102 applies a two-dimensional wavelet transformation to the original tile image obtained by the tile division of the original image (0LL) (decomposition level 0) into the tiles, and separates the sub bands (1LL, 1HL, 1LH, 1HH) shown in the decomposition level 1. The two-dimensional wavelet transformation/reverse transformation unit 102 continuously applies a two-dimensional wavelet transformation to the low frequency component 1LL of this layer, and separates the sub bands (2LL, 2HL, 2LH, 2HH) shown in the decomposition level 2. Further, the two-dimensional wavelet transformation/reverse transformation unit 102 then applies a two-dimensional wavelet transformation also to the low frequency component 2LL similarly, and the sub bands (3LL, 3HL, 3LH, 3HH) shows in the decomposition level 3 are separated. In FIG. 3, the sub bands subjected to encoding in each decomposition level are shown by gray.

In the case the decomposition level number is set to 3, for example, the sub bands (3HL, 3LH, 3HH, 2HL, 2LH, 2HH, 1HL, 1LH, 1HH) shown by gray are subjected to the encoding process, while the sub band 3LL is not encoded.

Next, in the quantization/reverse quantization unit 103, the bits subjected to encoding are determined with a designated order of encoding, and a context is generated from the bits surrounding the target bit.

Figure 4:
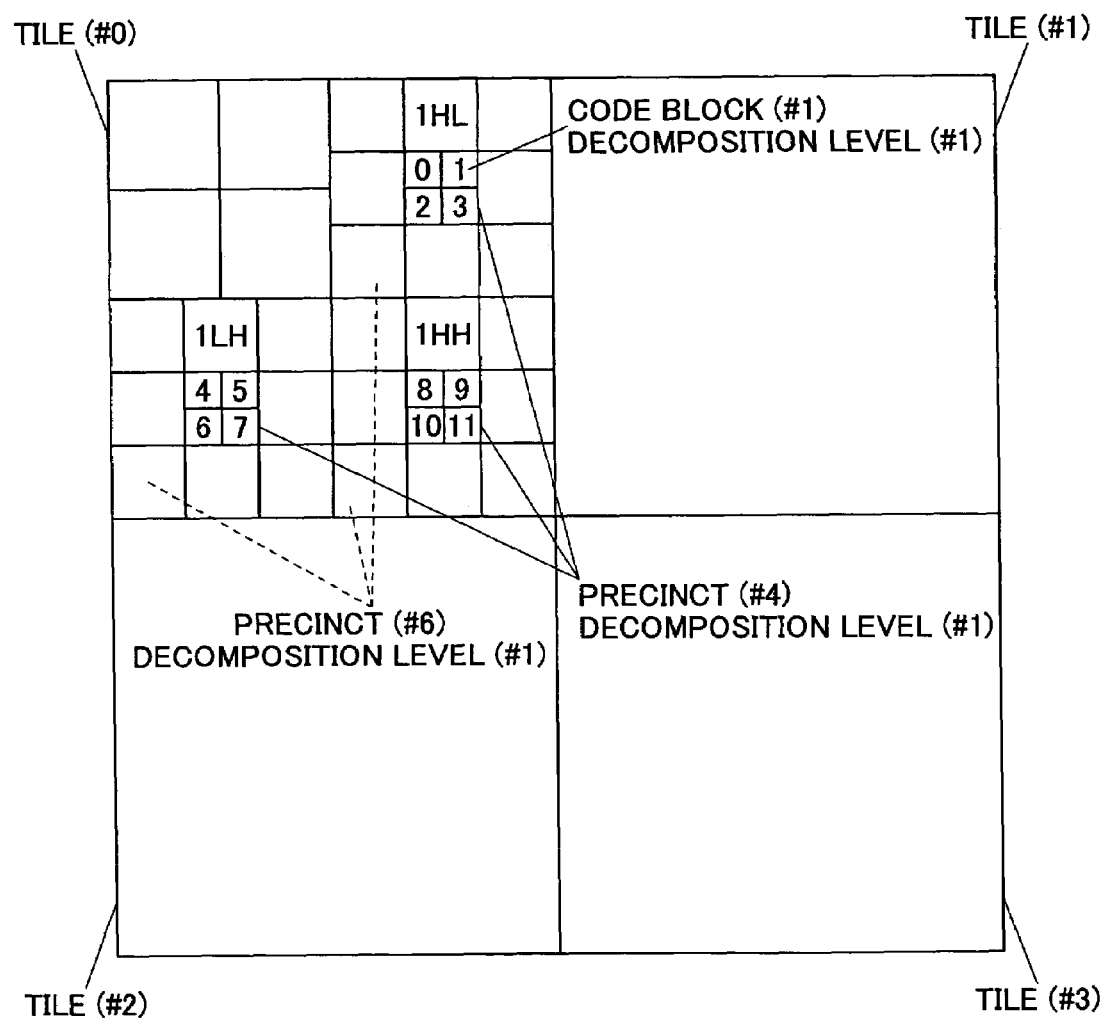
FIG. 4 is a diagram showing precincts.

FIG. 4 is a schematic diagram showing precincts.

Referring to FIG. 4, the wavelet coefficients finished with the quantization processing are divided into non-overlapping rectangles called "precinct" in each sub band. These precincts are introduced for using the memory area efficiently at the time of implementation.

As shown in FIG. 4, one precinct comprises three rectangular regions that coinciding spatially. Further, each precinct is divided into non-overlapping rectangles called "code block." This is used as the fundamental unit at the time of entropy coding.

Figure 5:
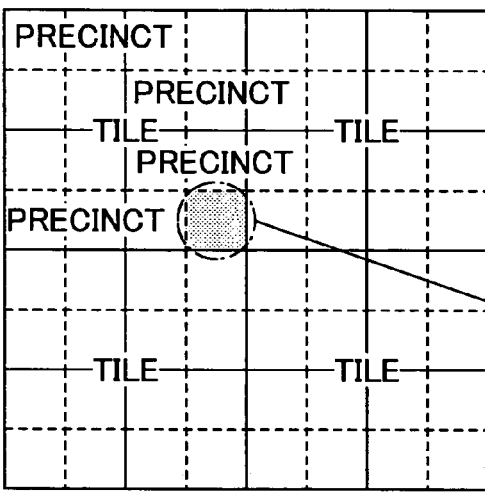
FIG. 5 is a diagram showing an example of the procedure of ranking bit planes.

FIG. 5 shows the outline of the processing that provides ranking to the values of the two-dimensional wavelet coefficients in the "bit plane" for each picture element or each code block, after conducting the two-dimensional wavelet transformation with decomposition into "bit plane" unit.

Referring to FIG. 5, it is possible to encode the coefficient values of the wavelet transformation by quantization as it is. In JPEG2000, on the other hand, the coefficient values are decomposed into "bit plane" units for improving the encoding efficiency. Thus, it is possible to attach ranking to the "bit plane" for each picture element or each code block.

FIG. 5 shows the procedure schematically.

It should be noted that FIG. 5 shows the example for the case an original image (32×32 picture elements) is divided into four tiles of 16×16 picture elements. The size of the precinct of the decomposition level 1 and the size of the code block are set to 8×8 picture elements and 4×4 picture elements, respectively. The number of the precinct and the code block are attached in the raster order. A mirroring method is used for expanding the picture elements beyond the tile boundary, and the wavelet coefficient values of the decomposition level 1 are obtained by conducting wavelet transformation with a reversible (5,3) filter.

Further, FIG. 5 shows a schematic diagram of a typical "layer" of the case of tile 0/precinct 3/code block 3.

The structure of the layer becomes comprehensible when the wavelet coefficient values are viewed from a lateral direction (bit plane direction).

Referring to FIG. 5, a single layer is comprised of bit planes of an arbitrary number. In this example, the layers 0, 1, 2, 3 are comprised of three bit planes, 1, 3 and 1.

Thereby, the layers containing the bit planes close to LSB are subjected to early quantization, while the layers close to MSB remains not being quantized until to the last moment. The method that discards the wavelet coefficient values from the layer close to LSB is called truncation. By using this, it is possible to control the quantization rate minutely.

Next, the entropy encoding/decoding unit 104 will be explained with reference to FIG. 6.

Figure 6:
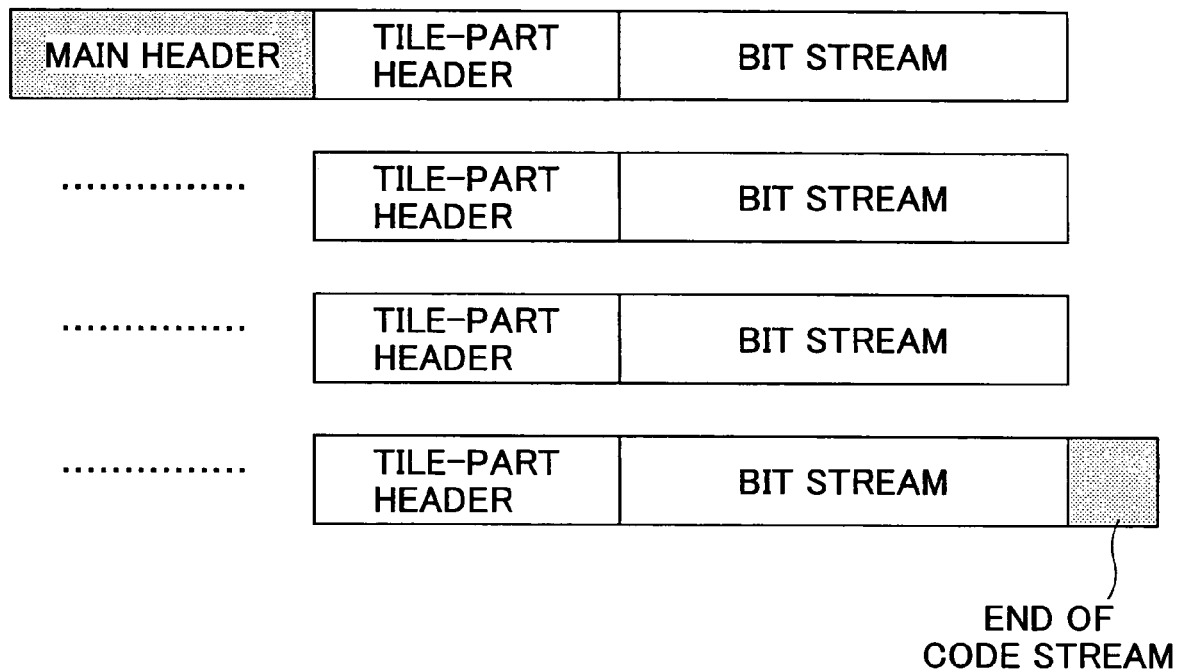
FIG. 6 is a schematic diagram showing an example of code stream of encoded image data.

FIG. 6 is a schematic diagram showing a code stream of encoded image data.

Referring to FIG. 6, the entropy encoding/decoding unit 104 (see FIG. 1) carries out encoding of the tile 112 for each of the RGB components by probability estimation based on the context and the target bit. Thus, encode processing is conducted in each tile 112 with respect to all the RGB components of the original image.

Next, tag processing unit 105 will be explained.

The tag processing unit 105 carries out the process of combining all the encoded data from the entropy encoding/decoding unit 104 into a single code stream and attach a tag to it.

FIG. 6 schematically shows the structure of a code stream.

Referring to FIG. 6, tag information called header is added to the head part of the code stream and also to the head part of the partial tile constituting each tile 112. Thereafter, the encoding data of each tile 112 follows. Further, a tag is added again to the end of the code stream.

On the other hand, at the time of decoding, the image data is formed from the code stream of each RGB component for each tile 112, conversely to the time of encoding.

Such processing will be explained briefly by using FIG. 1.

Referring to FIG. 1 again, the tag processing unit 105 interprets the tag information attached to the code stream coming in from outside, and decomposes the code stream to the code streams for each of the tiles 112 and for each of the RGB components. Further, decoding is conducted for each code stream of each tile 112 and each RGB component. Thereby, the location of the bit to be decoded is determined based on the order of the tag information inside the code stream, and context is generated in the quantization/reverse quantization unit 103 from the arrangement of the peripheral bits (already decoded) of the target bit.

Further, in the entropy encoding/decoding unit 104, the target bit is formed by conducting decoding based on the probability estimation from the context and code stream, and it is written into the location of the target bit.

The decoded data is spatially divided by the frequency band, and thus, each tile 112 is restored in each of the RGB components of the image data. The restored data is subjected to two-dimensional wavelet reverse transformation in the two-dimensional wavelet transformation/reverse transformation department 102, and the restored data is transformed back to the data of the original color system by the color space transformation/reverse transformation unit 101.

Image Edit Processing System

Next, an example of the construction of the image edit processing system of an embodiment of the present invention will be described.

Figure 7:
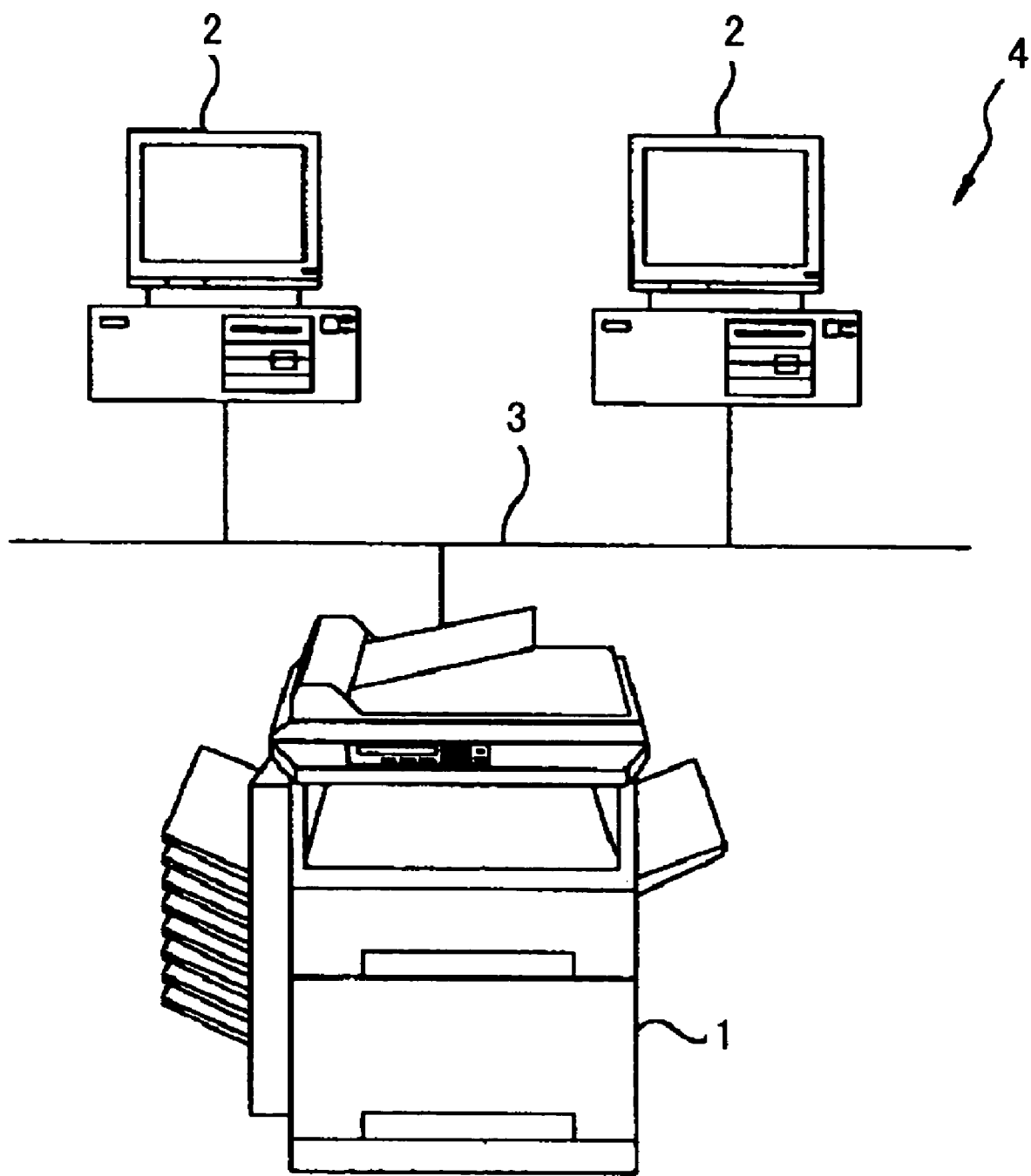
FIG. 7 is a schematic diagram showing an example of the construction of an image processing system used for editing images.

The present embodiment provides an image edit processing system 4 such as the one shown in FIG. 7 in which personal computers (PC) 2 of arbitrary number used for image edit processing are connected a multifunctional machine (MFP) 1 used for image formation, via a network 3 such as a LAN. Here, the multifunctional machine 1 may be the one equipped with a scanner, a printer, and an image processing unit not particularly illustrated, and may perform the functions of copying, printing, scanning, faxing, and the like.

The image processing unit of this multifunctional machine 1 has the function of a code data generation unit, including the function of JPEG2000 algorithm explained with reference to FIG. 1, and the like, and thus, the image processing unit forms the loss-less code data by dividing the image to be edited into one or more rectangular regions (tile) used for the unit of encoding process, and by conducting compression encoding according to the reversible mode of JPEG2000 algorithm for each of the rectangular regions (tile). Further, the image processing unit is provided with the function of the decoding unit that decodes the loss-less encoded data to the image data by the reversible mode of the JPEG2000 algorithm.

Further, the printer unit comprises the function of a printer engine that prints out the decoded image data, wherein the printing unit may use any printing method such as laser printing method that uses the art of electrostatic photography.

Figure 8:
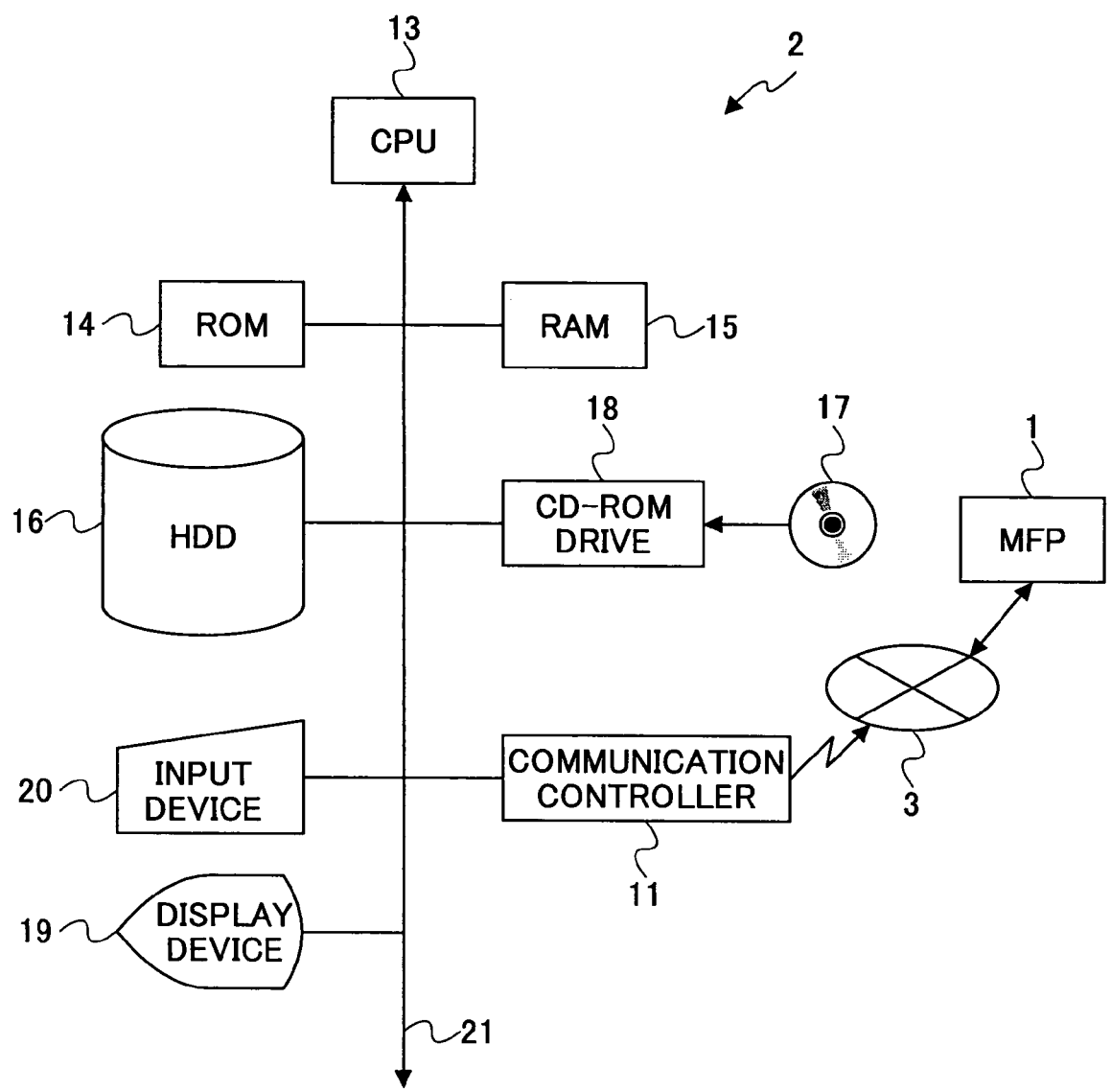
FIG. 8 is a block diagram showing an example of the hardware construction of a personal computer.

FIG. 8 is a block diagram schematically showing the hardware construction of the image edit processing device.

Referring to FIG. 8, one embodiment of the image edit processing device comprises the personal computer 2 connectable to the multifunctional machine 1, and the like, over the network 3 via a communication control unit 11.

Referring to FIG. 8, the image edit processing device of this embodiment that is implemented in the form of the personal computer 2 includes: a CPU (Central Processing Unit) 13 conducting data processing; a ROM (Read Only Memory) 14 storing information, a memory 15 such as RAM (Random Access Memory), and the like and a HDD (Hard Disk Drive) 16 for storing compressed encoded data such as image data; a medium reading device 18 such as a CD-ROM drive capable of reading storage medium 17 such as a CD-ROM medium used for storing information, distributing information to outside, or incorporating information from outside; a display device 19 of CRT (Cathode Ray Tube) or LCD (Liquid Crystal Display) for displaying the progress of processing or the result of processing to the operator; and an input device 20 such a keyboard or mouse used by the user to provide a command or information to the CPU13. Further, a bus controller 21 is provided for arbitrating the data transmitted and received between these various units.

In such personal computer 2, the CPU 13 activates a loader program inside the ROM14 when the user has turned on the power, and a program that manages the hardware and software of the computer called operating system is read from the HDD16 and expanded in the RAM15. With this, the operating system is activated. It should be noted that such an operating system activates a program, reads information and also saves information according to the operation of the user. Windows (registered trademark), UNIX (registered trademark), and the like, are known as representative operating system. On the other hand, the programs running on such an operating system are called application program.

In the construction of FIG. 8, the personal computer 2 holds the program of image edit processing in the HDD 16 as an application program. Thus, the HDD 16 functions as the storage medium for holding the program for image edit processing.

Also, it is generally practiced to store the program to be installed in the HDD16 in the removable storage medium 17 such as optical information recording medium including a CD-ROM or a DVD-ROM or magnetism medium such as FD, and the program recorded thereon is installed into the HDD 16 of the personal computer 2. Because of this, it is also possible that the storage media 17 having mobility such as an optical information record medium including CD-ROM, and the like, or a magnetic medium including FD, and the like, can be used for storing the program of image edit processing. Further, the program of image edit processing may be incorporated from outside via the communication control unit 11, and the like, and installed into the HDD16.

When the image processing program operating on the operating system is activated, the CPU 13 controls various units of the personal computer 2 by conducting various computation processing in accordance with the image processing program.

Here, it should be noted that the personal computer 2 is installed with a chip that includes a JPEG2000 specification and conducts reversible or irreversible compression/decoding processing to the image data in the form of hardware in accordance with the JPEG2000 algorithm shown in FIG. 1 similarly to the case of the multifunctional machine 1, and thus, the personal computer is capable of processing the code stream of compression encoded image data.

Image Edit Processing

In the image edit processing system 4 of this embodiment, it is possible to use the image edit processing 4 in such a manner that, whenever it becomes necessary to apply edit processing to the manuscript image at the time of reading the manuscript image by using the scanner of the multifunctional machine 1 and printing out the scanned image with the printer of the multifunctional machine 1, the image data read by the scanner of the multifunctional machine 1 is incorporated at first into the personal computer 2, and the edit processing is applied to the image data in the personal computer 2 according to the desired edit operation. Further, the image data thus edited with the printer of the multifunctional machine 1 is printed out again. With this, it becomes possible to obtain a clean printed copy in which traces of staple or traces of punch hole are eliminated by way of the edit operation conducted in the personal computer 2.

Now, explanation will be made with regard to the image edit processing in the image edit processing system 4 of the present embodiment for such a case with reference to the flowcharts of FIGS. 9A and 9B and FIG. 10.

When reading operation of edit mode is instructed by the user via the personal computer 2 in the copy operation using the multifunctional machine 1 in view of the need of editing the images, the manuscript image data subjected to editing read by the scanner of the multifunctional machine 1 is divided into one or more tiles (rectangular regions) used for the encoding unit by the image processing unit inside the multifunctional machine 1. By carrying out the reversible mode compression encoding by using the JPEG2000 algorithm for the tiles (rectangular regions) used for the encoding unit, the loss-less encoded data is formed.

Figure 10:
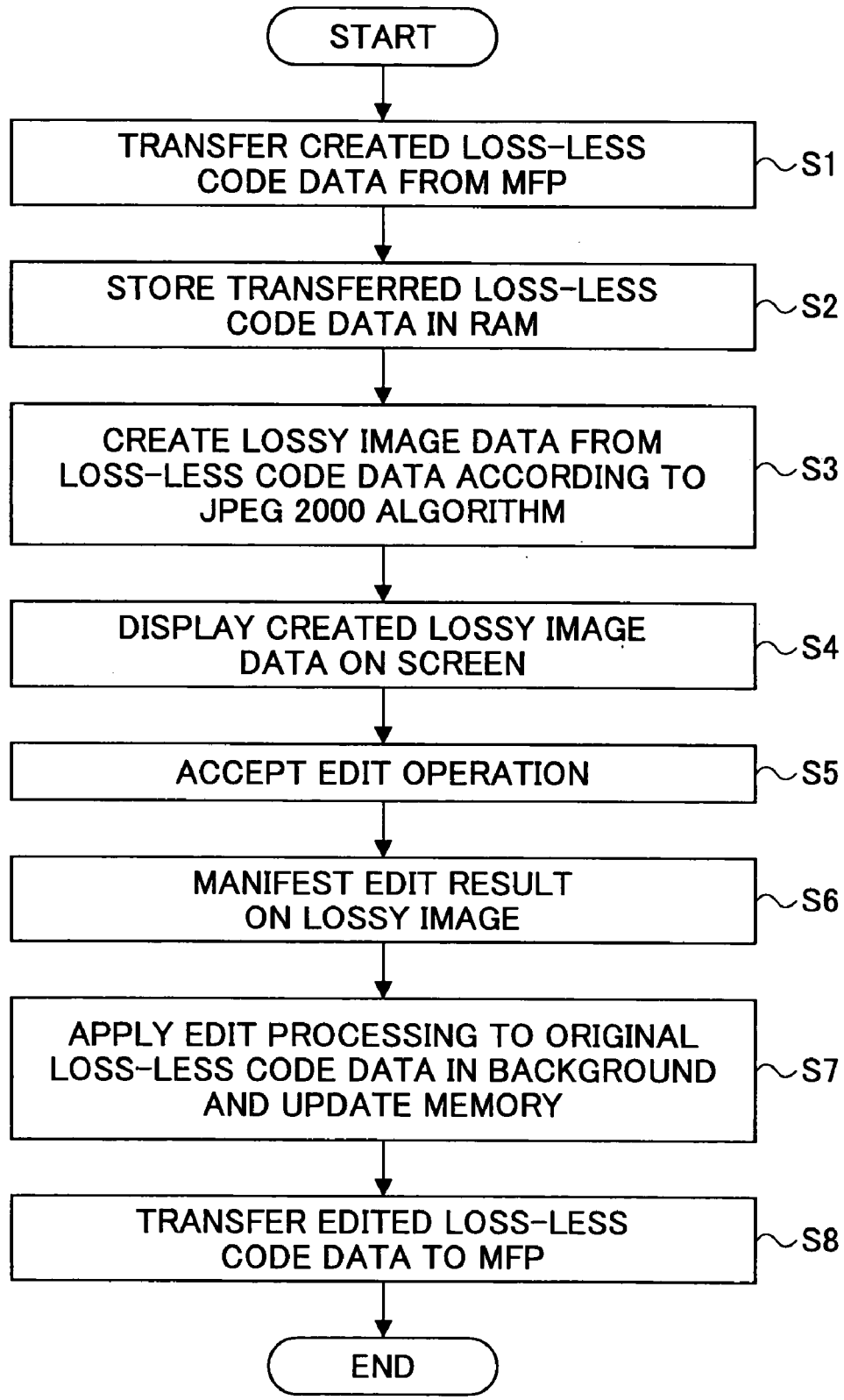
FIG. 10 is a schematic flowchart showing the image edit processing according to an embodiment of the present invention.

The generated loss-less encoded data is forwarded from the multifunctional machine 1 to the personal computer 2 via the network 3 in the step S1 of FIG. 10, wherein the loss-less encoded data thus forwarded is stored in the RAM 15 or HDD 16 in the step S2 as shown in FIG. 9A (image data acquisition unit or image data acquisition function).

Thereafter, in the step S3, irreversible lossy image data is generated with smaller data size by using the irreversible mode of JPEG2000 algorithm on the basis of the loss-less encoded data stored in the RAM 15 or HDD 16, and the irreversible lossy image data is stored in the RAM 15 or HDD 16 (image data creation unit or image data creation function). It should be noted that the processing of the step S3 is carried out by using JPEG2000 algorithm in which any of reversible mode processing and irreversible mode processing is possible and conversion from reversible to irreversible is possible in the encoded state. The lossy decoding process for this case may be the processing that extracts the compact image data having reduced data amount, while the process may also be the processing that extracts image data corresponding to a part of the encoding units. The created lossy image data is displayed on the screen of the display device 19 in the step S4 for the editing operation.

Because the user uses the compact lossy image data (small image size) created for the display purpose at the time of edit work of the user in one embodiment of the present invention, image access becomes possible at high speed and editing work with good response becomes possible. Also it is sufficient to provide only a small memory area for storing such data for the editing work, and there isn't a problem in which the memory 15 is occupied by the data for the editing work or the storage area of the HDD 16 used for holding the loss-less encoded data or other programs of the personal computer is pressed. In this way, the user can make the editing operation of the loss-less encoded data held in the HDD 16 while viewing the lossy image displayed on the screen of display device 19.

For example, in the case of conducting an editing operation for eliminating the trace of stapler in the manuscript as shown in FIG. 9B, the corresponding edit operation is accepted in the step S5, and in the step 6, the result of the editing corresponding to the edit operation is manifested to the lossy image data. (The edit-result manifesting unit). Because of the lossy image data is small, manifestation of such an editing result is achieved quickly with good response.

Further, in the step S7, the editing process corresponding to the editing operation is applied to the original loss-less encoded data held in the memory 15 or HDD 16 in the background (edit unit or edit function).

The timing for applying the editing operation to the original loss-less encoded data may be chosen such that the applying of the processing is conducted each time edit operation is made or such that the applying is made at a specified time point such as the time point in which a certain amount of the edit work has been made. Alternatively, it is possible to execute the application of the editing process at a certain time point designated by the user, in response to the pressing down of a preservation button by the user, for example. Further, such application of the editing process may be conducted at the end of the editing operation. In any case, the actual edit processing is applied to the original loss-less encoded data in the background, and thus, one embodiment of the present invention can maintain high picture quality. Further, because there is no need to display the loss-less encoded data during the editing process, there occurs no heavy load in the image display system of the computer.

When a printing command, and the like, is issued by the user thereafter, the loss-less encoded data stored in the RAM 15 or HDD 16 is forwarded to the multifunctional machine 1 via the network 3 in the step S8, wherein the loss-less encoded data is decoded to the image data by the decoding unit of the image processing unit within the multifunctional machine 1 by using the reversible mode of JPEG2000 algorithm, and an image is printed out from the printer on the basis of the decoded image data.

In this way, the output of high picture quality image becomes possible in one embodiment of the present invention in the case post-processing such as printing, and the like, is conducted for the image data after the editing because of the fact that the loss-less encoded data is printed out after the edit processing.

In the foregoing process, it is possible to conduct the step S6 and the step S7 simultaneously or in the reversed order.

Figure 11:
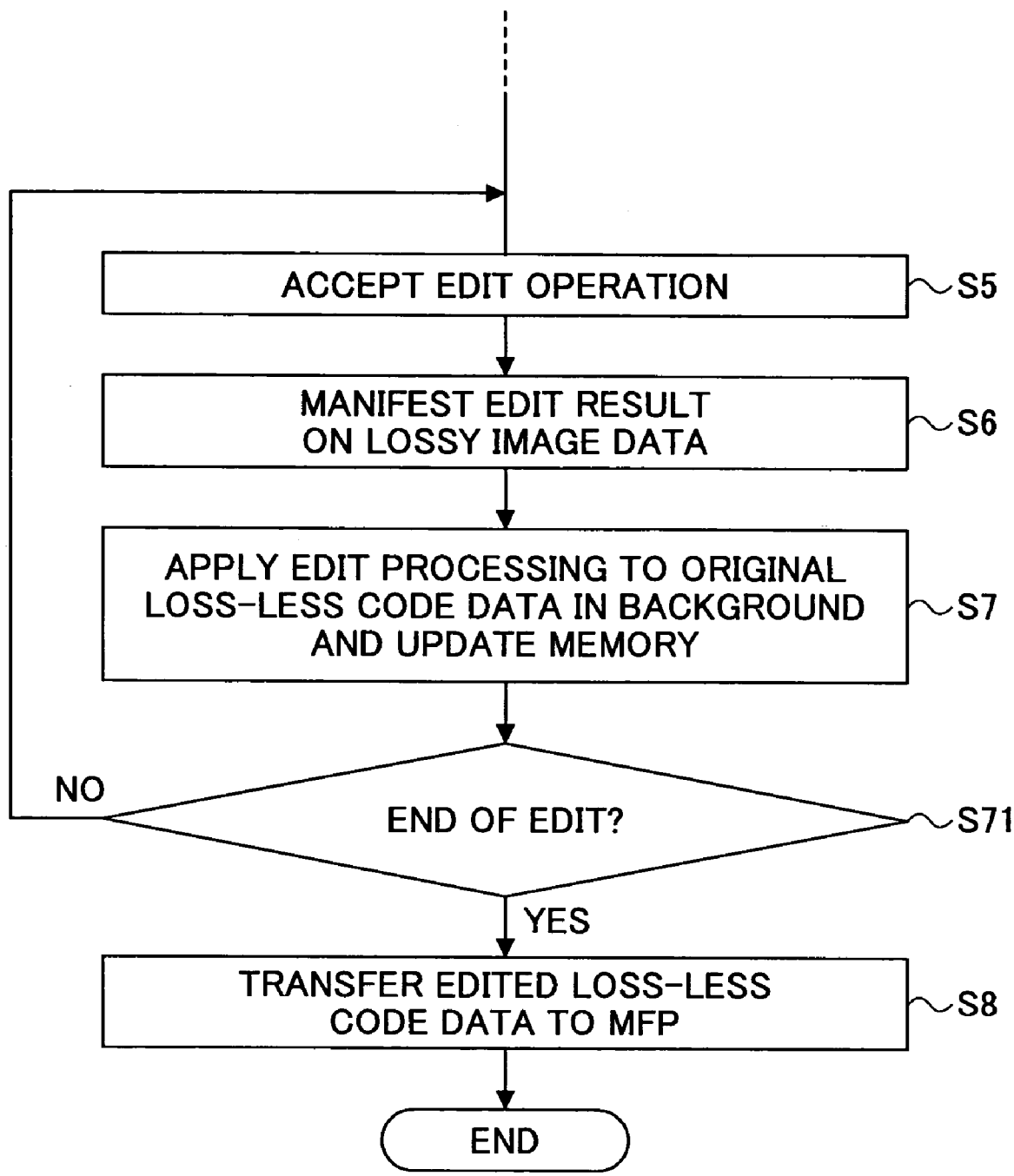
FIG. 11 is a diagram showing a modification of FIG. 10.

FIG. 11 is a flowchart showing a modification of the process of FIG. 10, wherein only those steps pertinent to this modification are shown in FIG. 10 and other steps are omitted.

Referring to FIG. 1, a judgment is made after the step 7 whether or not all the editing operations have been completed in the step 71, and if it is YES, the process proceeds to the next step 8, while if the result is NO, the process returns to the step 5.

In the process of FIG. 11, the content of the editing work is applied to the loss-less encoding data in the memory 15 or the HDD 16 each time the editing operation is carried out, and the result of editing is saved with reliability.

Figure 12:
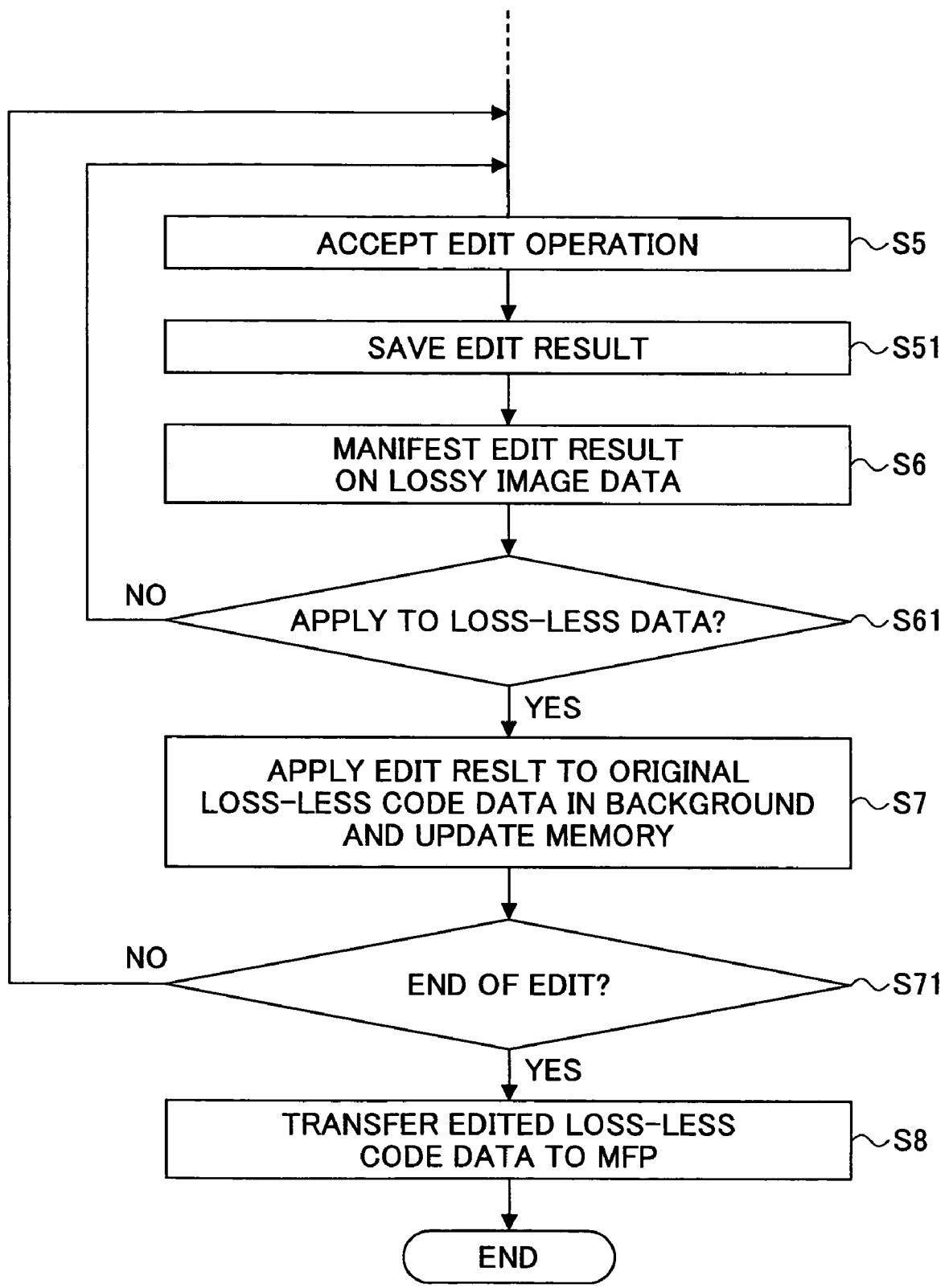
FIG. 12 is a diagram showing a different modification of FIG. 10.

FIG. 12 is a flowchart showing another modification of the process of FIG. 10. In FIG. 12, too, only the steps related to the modification are represented while other steps are eliminated.

Referring to FIG. 12, the contents of the editing operation of step 5 are saved, after the step S5, in the memory 15 or HDD 16 in the step S51, and after the step 6, the decision of the user is waited for in the step 61 as to whether or not the editing operation is applied to the loss-less encoded data in above-mentioned memory 15 or HDD 16.

In the case the decision of the user is YES, the next step S7 is executed immediately, and after the judgment of the step S71, the process returns to the step S5. This is the same as the process of FIG. 12.

On the other hand, if the decision of the user in the step S61 is NO, the process jumps over the step S7 and advances to the decision step S71 and returns to the step 5.

In this case, while the implementation of the editing operation to the loss-less encoded data in the step 7 is skipped, the contents of the editing operation are saved in the step S51, and thus, in the case the user has instructed YES in the step S61 in any point, the saved editing operation is applied to the loss-less encoded data all in once.

Figure 13:
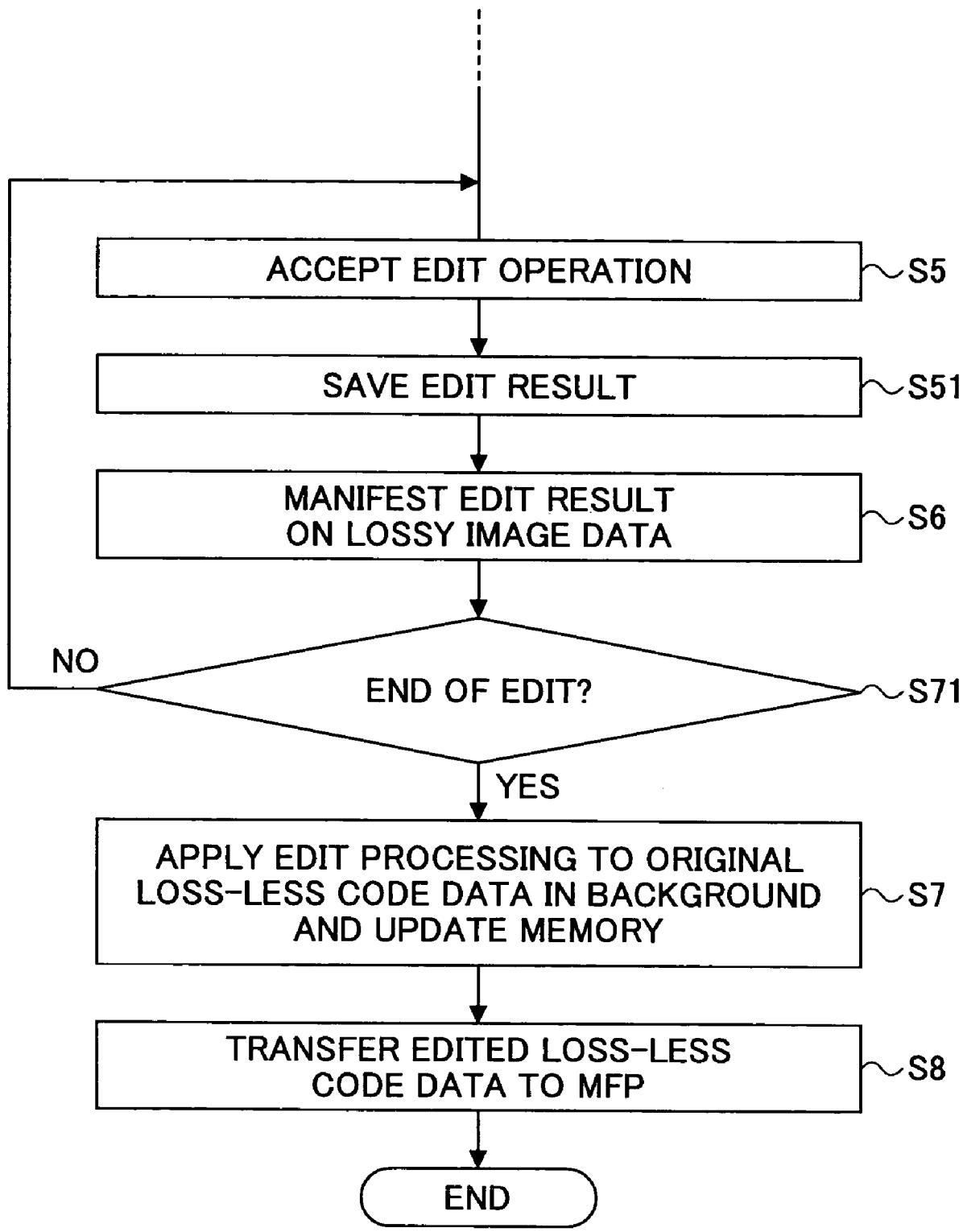
FIG. 13 is a diagram showing a further modification of FIG. 10.

Further, FIG. 13 is a flowchart showing a further modification of the process of FIG. 10.

Referring to FIG. 13, it should be noted that the step S7 is moved after the step S71 in the present embodiment, and thus, the editing operation is applied to the loss-less encoded data all in once after a series of editing operations have been completed.

In the process of FIG. 12 or FIG. 13, the application of the edit operation to the loss-less encoded data is not achieved during the editing operation, and because of this, it becomes possible to perform the editing operation with excellent response even when a computer of small computational power is used.

Image Edit Processing System

In the foregoing embodiment, lossy image data is created by the decoding processing of the original loss-less encoded data in the irreversible mode for the purpose of display at the time of editing (Step S3, S4), while one embodiment of the present invention can also create the image data from the original loss-less encoded data only for the tile part (encoding unit) to be edited by conducting the decoding process with the reversible mode of the JPEG2000 algorithm and by utilizing the feature of JPEG2000 algorithm of enabling random accessing at the time of decoding by conducting encoding for each tile (encoded unit image data creation unit or encoded unit image data creation function), and displaying the image data thus created for the tile on the screen of the display device 19 (edit display unit or edit display function) for the purpose of editing.

Figure 14:
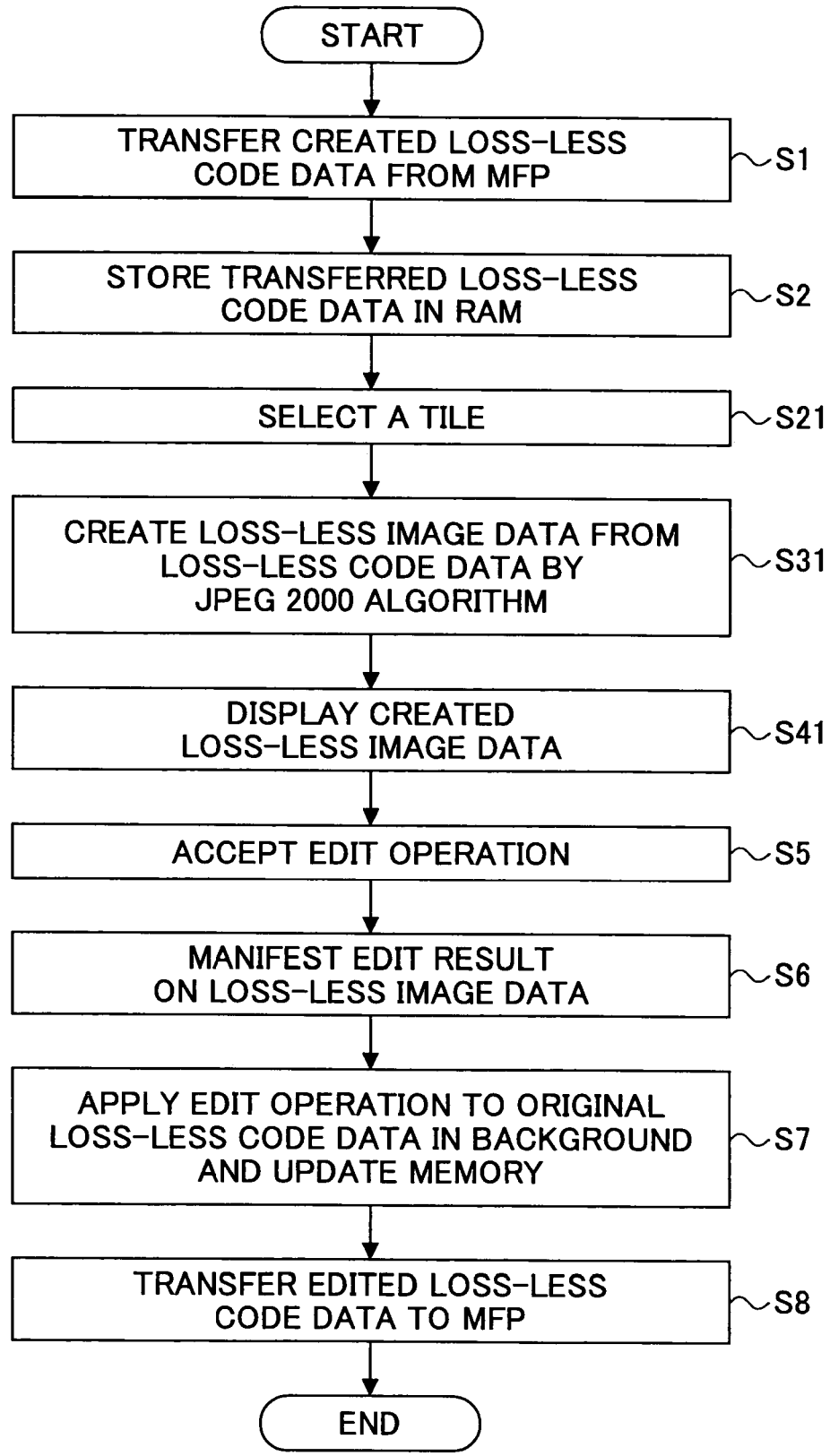
FIG. 14 is a flowchart showing an image edit processing according to an embodiment of the present invention.

FIG. 14 is a flowchart showing one embodiment of the present invention, wherein those steps corresponding to the steps explained previously are designated by the same reference numerals and the description thereof will be omitted.

Referring to FIG. 14, after the loss-less encoded data forwarded from the image formation device 1 is stored in the RAM 15 or HDD 16 in the step S2, a tile to be edited is designated in the step S21.

Next, in the step S31, loss-less image data of more compact size is decoded for the designated tile from the loss-less encoded data according to the reversible mode of JPEG2000 algorithm.

Further, in the step 41, the compact loss-less image data thus obtained is displayed on the screen.

Thereafter, the user conducts the editing operation to the displayed image in the process following the step S5 similarly to the previous embodiment and the corresponding editing process is applied to the loss-less encoded data.

In this embodiment, the image is decoded loss-less for only the tile part needed for the edit operation, and thus, it becomes possible to reduce the edit workspace (memory) while using the entirely loss-less process.

Further, the present invention is by no means limited to the embodiments described heretofore, but various variations and modifications may be made without departing from the scope of the invention.

What is claimed is:

1. An image processing apparatus, comprising:
an image data acquisition unit to acquire first encoded image data of a first data size;
an image data creation unit to create a second encoded image data of a second, smaller data size than the first data size from the first encoded image data;
a display unit to displaying an image corresponding to the second encoded image data in a display unit;
an editing unit to accept an edit operation to the image displayed in the display unit and for applying edit processing corresponding to the edit operation to the first encoded image data; and
an edit-result manifesting unit to manifest a result of the edit processing to the second encoded image data.

2. The image processing apparatus as claimed in claim 1, wherein the image data acquisition unit acquires the first encoded image data in the form of loss-less encoded image data.

3. The image processing apparatus as claimed in claim 2, wherein the image data acquisition unit acquires the first encoded image data by a reversible mode of JPEG2000 algorithm.

4. The image processing apparatus as claimed in claim 1, wherein the image data creation unit creates the second encoded image data irreversibly from the first encoded image data in the form of lossy encoded image data.

5. Image processing apparatus, as claimed in claim 4, wherein the image data creation unit acquires the second encoded image data by an irreversible mode of JPEG2000 algorithm.

6. The image processing apparatus as claimed in claim 4, wherein the second encoded image data is data in which resolution or number of gradations of the first encoded image data is reduced.

7. The image processing apparatus as claimed in claim 1, wherein the editing unit applies the edit processing to the first encoded image data consecutively each time the edit operation is accepted.

8. The image processing apparatus as claimed in claim 1, wherein the editing unit applies edit processing to the first encoded image data with a specified timing.

9. The image processing apparatus as claimed in claim 8, further comprising a storage device to save the edit operation.

10. The image processing apparatus as claimed in claim 8, wherein the editing unit applies edit processing corresponding to the edit operation to the first encoded image data with a timing specified by a user.

11. The image processing apparatus as claimed in claim 8, wherein the edit unit applies the edit processing corresponding to the edit operation to the first encoded image data upon completion of the edit operation.

12. The image processing apparatus as claimed in claim 1, further comprising an output unit to output the first encoded image data after the edit processing by the editing unit.

13. An image processing system, comprising:
an image formation device comprising an encoding data generation unit to generate loss-less encoded data by compressing and encoding an image data by a reversible mode, decoding unit to decode the loss-less encoding data to image data by a reversible mode, and a printer engine for printing out an image from the decoded image data; and
an image processing apparatus connected to the image formation apparatus via a network,
the image processing apparatus comprising:
an image data acquisition unit to acquire first encoded image data of a first data size;
an image data creation unit to create second encoded image data of a second, smaller data size than the first data size from the first encoded image data;
a display unit to display an image corresponding to the second encoded image data in a display unit;
an editing unit to accept an edit operation to the image displayed in the display unit and applying edit processing corresponding to the edit operation to the first encoded image data;
an edit-result manifesting unit to manifest an edit result of the edit processing to the second encoded image data; and
an output unit to output the first encoded image data to an outside of the image processing apparatus after the edit processing by the editing unit.

14. An image processing method, comprising:
acquiring first encoded image data of a first data size;
forming a second encoded image data of a second, smaller data size than the first data size from the first encoded image data;
displaying the second encoded image data in a display unit;
accepting an edit operation to the second encoded image data displayed in the display unit and applying edit processing corresponding to the edit operation to the first encoded image data; and
manifesting an edit result of the edit processing to the second encoded image data.

15. The method as claimed in claim 14, wherein the first encoded image data is acquired in the form of loss-less encoded image data in the image data acquisition step.

16. The method as claimed in claim 15, wherein the first encoded image data is acquired by a reversible mode of JPEG2000 algorithm in the image data acquisition step.

17. The method as claimed in claim 14, wherein forming the second encoded image comprises creating the second encoded image data irreversibly from the first encoded image data in the form of lossy encoded image data.

18. The method as claimed in claim 17, wherein forming the second encoded image comprises acquiring the second encoded image data by an irreversible mode of JPEG2000 algorithm.

19. The method as claimed in claim 17, wherein the second encoded image data is the data in which resolution or number of gradations of the first encoded image data is reduced.

20. The method as claimed in claim 14, wherein the edit processing is applied to the first encoded image data in the edit step each time the edit operation is accepted.

21. The method as claimed in claim 14, wherein accepting an editing operation comprises applying the edit processing to the first encoded image data with a predetermined timing.

22. The method as claimed in claim 21, further comprising saving the edit operation.

23. The method as claimed in claim 21, wherein accepting an editing operation comprises applying the edit processing corresponding to the edit operation to the first encoded image data with a timing designated by a user.

24. The method as claimed in claim 21, wherein accepting an editing operation comprises applying the edit processing corresponding to the operation to the encoded image data upon completion of the edit operation.

25. The method as claimed in claim 14, further comprising outputting the first encoded image data to an outside after the edit processing by the editing unit.

26. A computer-implemented method of image processing, comprising:
acquiring first encoded image data of a first data size;
forming a second encoded image data of a second, smaller data size than the first data size from the first encoded image data;
displaying the second encoded image data in a display unit;
accepting an edit operation to the second encoded image data displayed in the display unit and applying edit processing corresponding to the edit operation to the first encoded image data; and
manifesting an edit result of the edit processing to the second encoded image data.

27. The computer-implemented method as claimed in claim 26, wherein the first encoded image data is acquired in the form of loss-less encoded image data in the image data acquisition.

28. The computer-implemented method as claimed in claim 26, wherein the first encoded image data is acquired by a reversible mode of JPEG2000 algorithm in the image data acquisition.

29. The computer-implemented method as claimed in claim 26, wherein forming the second encoded image data comprises creating the second encoded image data irreversibly from the first encoded image data in the form of lossy encoded image data.

30. The computer-implemented method as claimed in claim 29, wherein acquiring first encoded image data comprises acquiring the second encoded image data by an irreversible mode of JPEG2000 algorithm.

31. The computer-implemented method as claimed in claim 29, wherein the second encoded image data is the data in which resolution or number of gradations of the first encoded image data is reduced.

32. The computer-implemented method as claimed in claim 26, wherein the edit processing is applied to the first encoded image data in the edit step each time the edit operation is accepted.

33. The computer-implemented method as claimed in claim 26, wherein accepting an editing operation comprises applying the edit processing to the first encoded image data with a predetermined timing.

34. The computer-implemented method as claimed in claim 33, further comprising saving the edit operation.

35. The computer-implemented method as claimed in claim 33, wherein accepting an editing operation comprises applying the edit processing corresponding to the edit operation to the first encoded image data with a timing designated by a user.

36. The computer-implemented method as claimed in claim 33, wherein accepting an editing operation comprises applying the edit processing corresponding to the operation to the encoded image data upon completion of the edit operation.

37. The computer-implemented method as claimed in claim 26, further comprising outputting the first encoded image data to an outside after the edit processing by the editing unit.

38. An article of manufacture having one or more computer readable storage media storing instructions thereon which, when executed by a computer having an image processing apparatus, where the image processing apparatus is in communication with another image processing apparatus, causes the computer to perform a method comprising:
  acquiring a first encoded image data of a first data size;
  forming a second encoded image data of a second, smaller data size than the first data size from the first encoded image data;
  displaying the second encoded image data in a display unit;
  accepting an edit operation to the second encoded image data displayed in the display unit and applying edit processing corresponding to the edit operation to the first encoded image data; and
  manifesting an edit result of the edit processing to the second encoded image data.

39. The article of manufacture as claimed in claim 38, wherein the first encoded image data is acquired in the form of loss-less encoded image data in acquiring the first encoded image data.

40. The article of manufacture as claimed in claim 39, wherein the first encoded image data is acquired by a reversible mode of JPEG2000 algorithm in acquiring the first encoded image data.

41. The article of manufacture as claimed in claim 38, wherein forming the second encoded image data comprises creating the second encoded image data irreversibly from the first encoded image data in the form of lossy encoded image data.

42. The article of manufacture as claimed in claim 41, wherein forming the second encoded image data comprises acquiring the second encoded image data by an irreversible mode of JPEG2000 algorithm.

43. The article of manufacture as claimed in claim 41, wherein the second encoded image data is the data in which resolution or number of gradations of the first encoded image data is reduced.

44. The article of manufacture as claimed in claim 38, wherein the edit processing is applied to the first encoded image data in the edit function each time the edit operation is accepted.

45. The article of manufacture as claimed in claim 38, wherein accepting the edit operation comprises applying the edit processing to the first encoded image data with a predetermined timing.

46. The article of manufacture as claimed in claim 45, further saving the edit operation.

47. The article of manufacture as claimed in claim 45, wherein accepting the edit operation comprises applying the edit processing corresponding to the edit operation to the first encoded image data with a timing designated by a user.

48. The article of manufacture as claimed in claim 45, wherein accepting the edit operation comprises applying the edit processing corresponding to the operation to the encoded image data upon completion the edit operation.

49. The article of manufacture as claimed in claim 38, wherein the method further comprises outputting the first encoded image data to an outside after the edit processing by the editing unit.

* * * * *